(12) United States Patent
Kim

(10) Patent No.: US 7,322,401 B2
(45) Date of Patent: Jan. 29, 2008

(54) VENTILATOR

(75) Inventor: Jeong Yong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/048,741

(22) Filed: Feb. 3, 2005

(65) Prior Publication Data

US 2005/0263266 A1    Dec. 1, 2005

(30) Foreign Application Priority Data

May 27, 2004    (KR)    ........................ 10-2004-0037801

(51) Int. Cl.
*F28D 15/00*    (2006.01)
*F28F 13/12*    (2006.01)
*F24F 3/00*    (2006.01)

(52) U.S. Cl. .................. 165/104.21; 165/122; 165/59; 454/233

(58) Field of Classification Search ........... 165/104.21, 165/122, 127, 53–54, 58–59, 66, 48.1, 104.33, 165/104.34; 62/454; 454/184, 233
See application file for complete search history.

(56) References Cited

U.S. PATENT DOCUMENTS

| | | | | |
|---|---|---|---|---|
| 2,401,560 A | * | 6/1946 | Graham et al. ................ | 165/59 |
| 3,788,388 A | * | 1/1974 | Barkmann .................... | 165/272 |
| 3,884,292 A | * | 5/1975 | Pessolano et al. ..... | 165/104.26 |
| 4,333,517 A | * | 6/1982 | Parro ........................... | 165/53 |
| 4,333,520 A | * | 6/1982 | Yanadori et al. ............... | 165/59 |
| 4,600,050 A | * | 7/1986 | Noren .................... | 165/104.14 |
| 4,896,716 A | * | 1/1990 | Sotani et al. .................. | 165/54 |
| 5,123,479 A | * | 6/1992 | Pravda ......................... | 165/86 |
| 5,183,098 A | * | 2/1993 | Chagnot ........................ | 165/8 |
| 5,189,884 A | * | 3/1993 | Sami ........................... | 62/114 |
| 6,039,111 A | * | 3/2000 | Kawaguchi et al. ... | 165/104.14 |
| 6,131,647 A | * | 10/2000 | Suzuki et al. .......... | 165/104.33 |
| 6,321,460 B1 | * | 11/2001 | Jin ................................ | 34/77 |

FOREIGN PATENT DOCUMENTS

| | | |
|---|---|---|
| CN | 2143304 | 10/1993 |
| JP | 09178240 A * | 7/1997 |
| JP | 09-280644 | 10/1997 |

* cited by examiner

*Primary Examiner*—Tho Duong
(74) *Attorney, Agent, or Firm*—Birch, Stewart, Kolasch & Birch, LLP

(57) ABSTRACT

Ventilator including a case having a first flow passage and a second flow passage therein, at least one fan in the case for supplying room air to a room through the first flow passage, and guiding outdoor air to the room through the second flow passage, and a heat exchanger in the case, the heat exchanger having a working fluid therein for repeating evaporation (heat absorption) and condensing (heat dissipation) by a temperature difference of the air flowing through the first flow passage and the second flow passage, for making the air flowing through the first flow passage and the air flowing through the second flow passage to heat exchange, thereby providing a ventilator which is thin, can be installed conveniently, and can recover a thermal energy from room air, and reduce a pressure loss and noise.

30 Claims, 2 Drawing Sheets

VENTILATOR

CROSS-REFERENCE TO RELATED APPLICATIONS

This application claims the benefit of Korean Application No. P2004-37801 filed on May 27, 2004, which is hereby incorporated by reference as if fully set forth herein.

BACKGROUND OF THE INVENTION

1. Field of the Invention

The present invention relates to ventilators, and more particularly, to a ventilator which is thin, can be installed conveniently, and can recover a thermal energy from room air, and reduce a pressure loss and noise.

2. Discussion of the Related Art

In general, the ventilator discharges room air to an outside of a room, and supplies outdoor air to the room. The ventilator is essential for a building, and mounted on a ceiling or a wall. The ventilator is in communication with the outside of the room through ducts in the ceiling or the wall.

The ventilator is bulky due to units built therein, such as fan. In order to install the ventilator on each of storys of a building, higher storys are required. According to this, because the higher storys are required, a construction cost is increased substantially.

Moreover, when it is intended to mount the ventilator on a window or a wall, the mounting is difficult because of the bulk and complicate flow passages.

SUMMARY OF THE INVENTION

Accordingly, the present invention is directed to a ventilator that substantially obviates one or more problems due to limitations and disadvantages of the related art.

An object of the present invention is to provide a ventilator which is thin, easy to install, and can recover heat from room air, and reduce a pressure loss and noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ventilator includes a case having a first flow passage and a second flow passage therein, at least one fan in the case for supplying room air to a room through the first flow passage, and guiding outdoor air to the room through the second flow passage, and a heat exchanger in the case, the heat exchanger having a working fluid therein for repeating evaporation (heat absorption) and condensing (heat dissipation) by a temperature difference of the air flowing through the first flow passage and the second flow passage, for making the air flowing through the first flow passage and the air flowing through the second flow passage to heat exchange.

Preferably, the heat exchanger includes a plurality of heat pipes.

Preferably, the heat exchanger further includes a plurality of fins in contact with an outside circumferential surface of the heat pipe, for increasing a heat exchanger area.

Preferably, the ventilator further includes a panel for isolating the first flow passage from the second flow passage, and the fans are provided to the isolated fans respectively.

Preferably, the heat exchanger includes heat pipes provided adjacent to each of the fans.

Preferably, the heat pipe is bent so as to be mounted in front of each of the fans.

Preferably, the heat pipe is passed through the panel, and bent such that the heat pipe has a shape symmetry with respect to the panel.

Preferably, the heat exchanger further includes a plurality of fins in contact with an outside circumferential surface of the heat pipe, for increasing a heat exchanger area.

Preferably, the first flow passage is deflected at inside of the case such that a direction of an air flow introduced into the case and a direction of an air flow discharged to an outside of the room are different.

Preferably, the second flow passage is deflected at inside of the case such that a direction of an air flow introduced into the case and a direction of an air flow discharged to an outside of the room are different.

Preferably, the fan draws air in an axial direction and discharges in a radial direction.

Preferably, the second flow passage further includes a filter provided between an inside of the case and an outside of the room.

In another aspect of the present invention, a ventilator includes a case having an inlet and an outlet in communication with a room and a supply port and an exhaust port in communication with an outside of the room, a panel making the inlet and the exhaust port to be in communication and the outlet and the supply port to be in communication, a fan at least in one of spaces formed by the inlet and the exhaust port, and the outlet and the supply port, and a heat exchanger in the case, the heat exchanger having a working fluid therein for repeating evaporation (heat absorption) and condensing (heat discharge) by a temperature difference of the air discharged into the room and exhausted to an outside of the room, for making the air discharged into the room and the air exhausted to an outside of the room to heat exchange.

Preferably, the heat exchanger further includes a heat pipe passed through the panel, for making the air passing through the inlet and the exhaust port, and the air passing through the outlet and the supply port to heat exchange with each other.

Preferably, the heat exchanger further includes a plurality of fins in contact with an outside circumferential surface of the heat pipe, for increasing a heat exchanger area.

Preferably, the fan is provided to a space formed by the inlet and the exhaust port and a space formed by the outlet and the supply port.

Preferably, the heat exchanger includes a heat pipe passed through the panel, and bent with reference to the panel, so as to be provided between the inlet and the fan, and the supply port and the fan.

Preferably, the heat exchanger further includes a plurality of fins in contact with an outside circumferential surface of the heat pipe, for increasing a heat exchanger area.

Preferably, the exhaust port is perpendicular to the inlet such that a flow direction of air introduced into the case and a flow direction of air discharged to an outside of the room are different.

Preferably, the outlet is perpendicular to the supply port such that a flow direction of air introduced into the case and a flow direction of air supplied to the room are different.

Preferably, the fan draws air in an axial direction, and discharges in a radial direction.

The ventilator further includes a filter provided to the supply port.

In another aspect of the present invention, a ventilator includes a case, a fan in the case for drawing/discharging room/outdoor air, and a heat exchanger in the case, the heat exchanger having a coaxial tube with an inner capillary tube for making closed circulation of a working fluid therein by a temperature difference of room air and outdoor air to make a heat absorption reaction at one end thereof, and a heat discharge reaction at the other end thereof.

Preferably, the ventilator further includes a panel for dividing an inside space of the case, and a fan is provided to each of divided spaces.

Preferably, the fan is of a centrifugal type for drawing air in an axial direction and discharging the air in a radial direction.

Preferably, the case has air inlets in axial directions of the fans in opposite sides of the case with reference to the panel, and air outlets in radial directions of the fans in opposite sides of the case with reference to the panel.

Preferably, the heat exchanger includes a plurality of heat pipes passed through the panel so as to be arranged symmetry with reference to the panel, and a plurality of fins in contact with an outside circumferential surface of the heat pipe.

Preferably, the heat pipe has opposite sides arranged in front of the fans, respectively.

Preferably, the ventilator further includes a filter in an inside space of the case into which outdoor air is to be introduced for filtering outdoor air.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
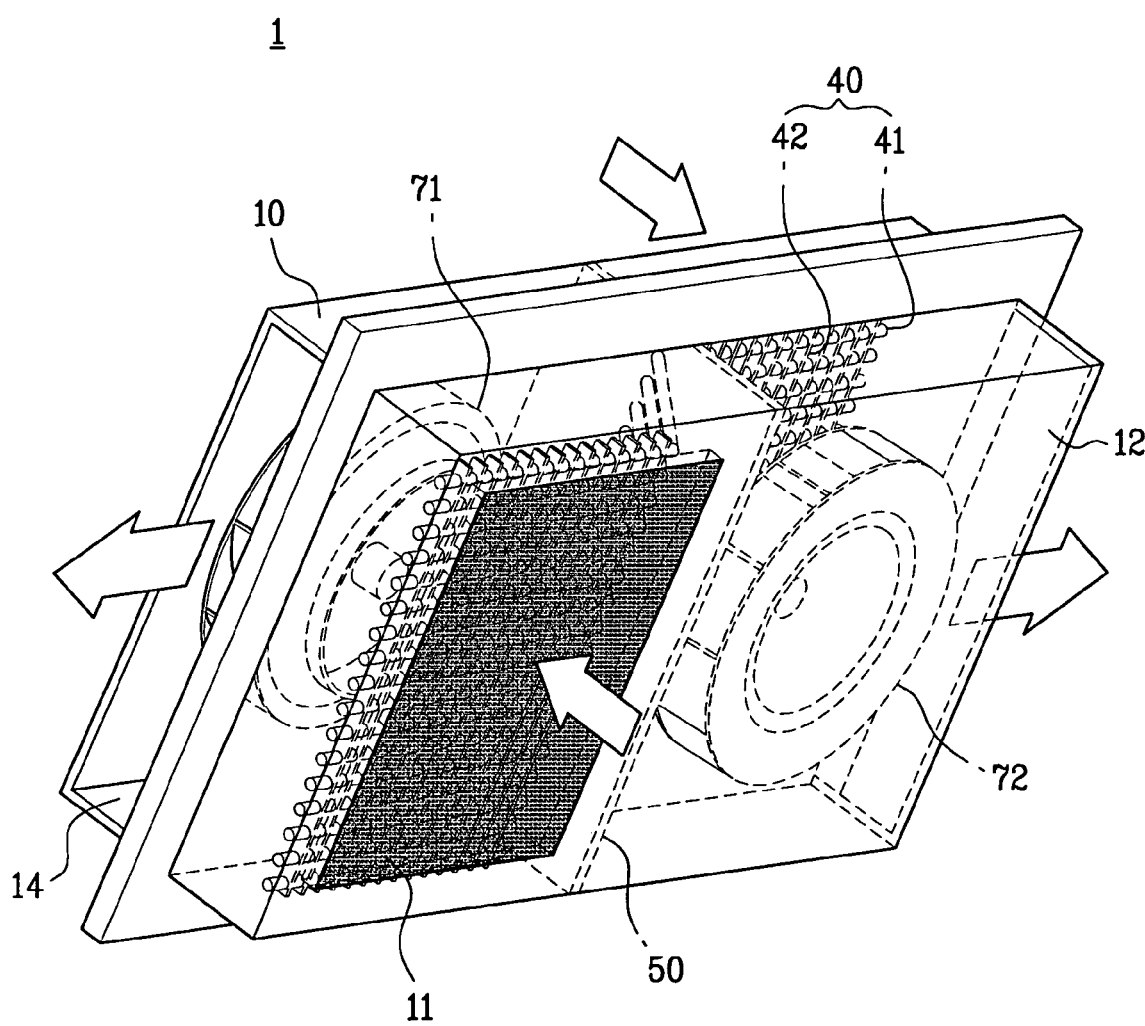
FIG. 1 illustrates a perspective view of a ventilator in accordance with a preferred embodiment of the present invention.
Figure 2:
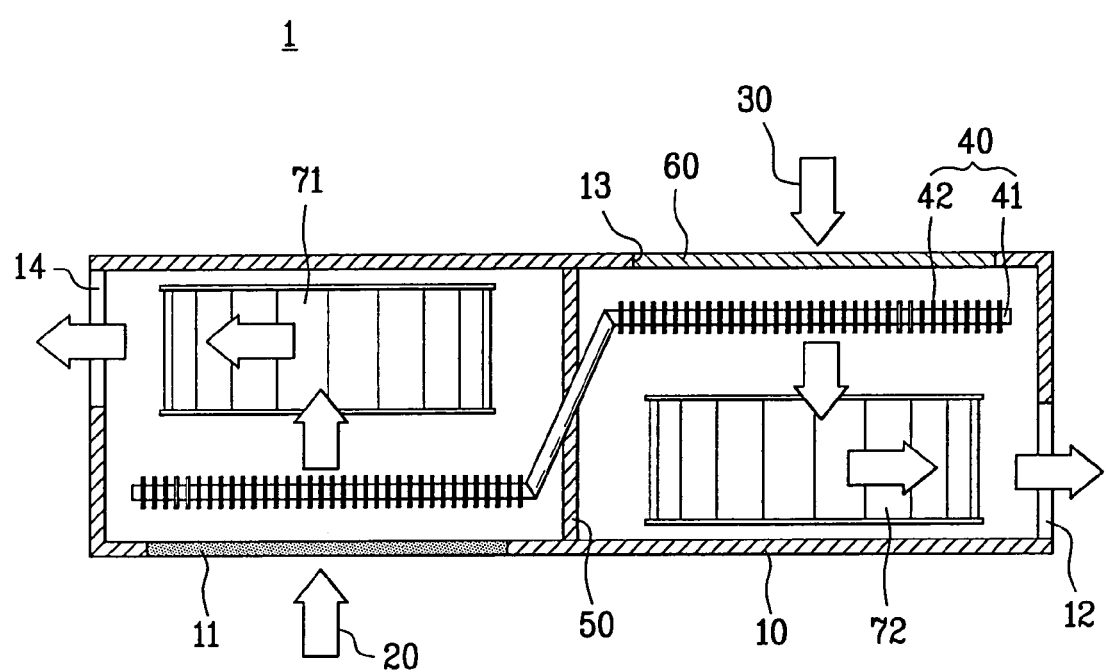
FIG. 2 illustrates a side view of a ventilator in accordance with a preferred embodiment of the present invention.

Referring to FIGS. 1 and 2, the ventilator includes a case 10, fans 71, and 72, and a heat exchanger 40.

The case 10 forms an exterior, and is mounted on a ceiling or a window of a building. The case 10 has a first flow passage 20 and a second flow passage 30 formed therein. The first flow passage 20 guides room air to an outside of the room, and the second flow passage 30 guides an outdoor air to the room.

In order to fabricate a compact ventilator 1, the first flow passage 20 is deflected within the case 10 for making a flow direction of the air introduced into the case different from a flow direction of the air discharged to an outside of the room, and the second flow passage 30 is also deflected within the case 10 for making a flow direction of the air introduced into the case different from a flow direction of the air discharged to the room.

In the meantime, at least one fan 71, and 72 provided to an inside of the case 10 guides the air to the room/the outside of the room through the first flow passage 20, and the second flow passage 30. For preventing the first flow passage 20 and the second flow passage from interfering with each other, a panel 50 is provided for dividing an inside space of the case 10, to isolate the first flow passage 20 from the second flow passage 30.

The fans 71, and 72, respectively provided to the two spaces, i.e., the first flow passage 20, and the second flow passage 30 in the case 10, enable to make the air to move more effectively. A case will be described, in which the fans 71, and 72 are provided to the first flow passage 20, and the second flow passage 30.

In order to make the ventilator 1 compact, and the flow passages to have larger suction areas respectively, the fans 71, and 72 are of a centrifugal type which draws air in an axial direction, and discharges in a radial direction. In this case, the first flow passage 20, and the second flow passage 30 are deflected within the case 10. Meanwhile, the fans 71, and 72 may be of an axial type which draws and discharges air in an axial direction. In this case, the first flow passage 20, and the second flow passage 30 are, not deflected, but straight.

The heat exchanger 40 is provided in the case 10. The heat exchanger 40 has working fluid therein which repeats evaporation and condensation according to a temperature difference of the air moving through the first flow passage 20 and the second flow passage 30. The working fluid absorbs heat when the working fluid evaporates, and discharges heat when the working fluid condenses, so that the air in the first flow passage 20 and the air in the second flow passage 30, both are in contact with the heat exchanger 40, make heat exchange with each other. That is, the heat exchanger 40 has one end in contact with the air in the first flow passage 20 to make heat exchange therewith, and the other end in contact with the air in the second flow passage 30 to make heat exchange therewith.

For making such an operation, the heat exchanger 40 includes a heat pipe 41. The heat pipe 41 of the heat exchanger 40 includes the working fluid for transferring heat, a closed pipe under a vacuum, and a wick in the pipe having a central hole for moving the working fluid heated at one side to the other side, and the working fluid cooled at the other side to one side. The wick has a mesh or groove shape so that a capillary tube phenomenon is made by surface tension of the working fluid.

That is, the heat exchanger 40 has a coaxial tube with a capillary inner tube the working fluid is provided therein. The heat exchanger 40 has a closed circuit for the working fluid to circulate therethrough by a temperature difference between room air and outdoor air, to make heat absorption reaction at one end, and heat discharge reaction at the other end.

If a room temperature is higher than an outdoor temperature, the working fluid absorbs heat from air in the first flow passage 20, and evaporates, at one end of the heat exchanger 40, and discharges heat to air in the second flow passage 30, and condenses, at the other end of the heat exchanger 40, to transfer heat from the air in the first flow passage 20 to the air in the second flow passage 30. According to this, the heat exchanger 40 elevates a temperature of the air in the second flow passage 30, or an opposite operation is possible to transfer heat from the second flow passage 30 to the first flow passage 20.

In the meantime, for making more efficient heat exchange, the heat exchanger 40 includes a plurality of heat pipes 41 adjacent to the fan 71, and 72. For making an area of the heat pipes 41 in contact with the air in the flow passages larger, the heat pipes 41 are mounted in front of the fan 71, or 72 at which the fan 71, or 72 has a larger air flow area. For mounting the heat pipes 41 in front of the fans 71 and 72, the heat pipes 41 are bent. In this instance, a front of the fan 71, or 72 is defined to be a side air is drawn therethrough.

The heat exchanger 40 is passed through, and secured to the panel 40, and the heat pipes 41 are bent at end portions of the fans 71, and 72, so as to be symmetry with reference to the panel 50.

In the meantime, the heat exchanger 40 further includes a plurality of fins 42 each in contact with an outside circumferential surface of the heat pipe to enlarge heat exchange surfaces with the air in the first flow passage 20, and the second flow passage 30. As shown, the fins 42 are fitted in zigzag to the heat pipes 41 to enlarge a contact area with air.

The ventilator 1 with such a heat exchanger 40 can be compact.

Moreover, there is a filter 60 mounted on an inside or on the case 10 in the second flow passage 30, for filtering air discharged into the room. For providing a large area so that the filter 60 filters air more effectively, the filter 60 is mounted between the inside of the case 10, and an outside of the room. That is, the filter 60 is mounted on a side through which the fan 71 or 72 draw air.

The operation of the ventilator 1 will be described.

Upon putting the fan 71, and 72 into operation, room air is drawn into the case 10 through the first flow passage 20, and discharged to an outside of the room. Outdoor air is drawn into the case 10 through the second flow passage 30, and discharged into the room.

In this instance, if a temperature of the room air is higher than a temperature of the outdoor air, the room air passing through the first flow passage 20 comes into contact with the heat exchanger 40 in the first flow passage 20, to heat and evaporate the working fluid in the heat exchanger 40.

The evaporated working fluid moves through an inside of the heat exchanger 40, toward the second flow passage 30. Then, the working fluid condenses, and discharges heat at a portion in contact with the outdoor air passing through the second flow passage 30, to transfer heat to the outdoor air. Then, the working fluid returns to a direction of the first flow passage 20 again. In this instance, the working fluid returns to the direction of the first flow passage 20 by the capillary tube phenomenon.

In more detail, as described before, the heat exchanger 40 has a heat pipe 41 of a coaxial tube. The working fluid in the heat pipe 41 absorbs heat from the room air at one end thereof, and evaporate, and moves to the other end of the heat pipe 41 through an inner tube of the heat pipe 41. Then, the working fluid is condensed, and discharges heat at the other end of the heat pipe 41, to transfer heat to the outdoor air, and returns of one end of the heat pipe 41 along an outer pipe of wick by the capillary tube phenomenon.

Thus, since working fluid circulates closed in the heat pipe 41, the heat exchanger 40 transfers heat from the room air passing through the first flow passage 20 to the outdoor air passing through the second flow passage 30.

In the meantime, in an opposite case of above assumption, i.e., a room air temperature is lower than an outdoor air temperature, when an opposite phenomenon is occurred, the outdoor air is dropped to a lower temperature, before being discharged into the room.

In the meantime, in order to form the flow passages, the case 10 has a inlet 11, and a outlet 12 in communication with the room, and a supply port 13, and an exhaust port 14 in communication with an outside of the room. The case 10 has a panel 50 to divide an inside space of the case 10 such that the inlet 11 and the exhaust port 14 are in communication, and the outlet 12 and the supply port 13 are in communication.

In order to make the ventilator 1 compact, the exhaust port 14 is formed perpendicular to the inlet 11 such that a flow direction of air introduced into the case 10 is different from a flow direction of the air discharged to the outside of the room. The outlet 12 is perpendicular to the supply port 13 such that a flow direction of the air introduced into the case 10 is different from a flow direction of the air supplied to the room.

That is, the case 10 has a rectangular section, with the inlet 11 in one side thereof. Opposite to the one side, there is the supply port 13. In the meantime, the exhaust port 14 is formed in the other side adjacent to the one side, and the outlet 12 is also in another other side adjacent to the one side. Of course, the inlet 11 and the outlet 12 may also be formed in the same side, and the exhaust port 14 and the supply port 13 may also be formed in the same side.

The fans 71, and 72 may be mounted in at least one of spaces between the inlet 11 and the exhaust port 14, and between the outlet 12 and the supply port 13. Or, alternatively, the fans 71, and 72 may be mounted in a space between the inlet 11 and the exhaust port 14, and a space between the outlet 12 and the supply port 13, of the divided opposite spaces of the case 10, respectively, for more efficient movement of the air.

If the fans 71, and 72 are of a centrifugal type, the inlet 11 and the supply port 13 are provided in a direction the fans 71, and 72 draw air, and the exhaust port 14 and the outlet 12 are provided in a direction the fans 71, and 72 discharge air. That is, an air suction portion having the inlet 11 and the supply port 13 that draw air into the case 10 is formed in an axial direction of the fans 71, and 72, and an air discharge portion that discharges air to an outside of the case 10 is formed in a radial direction of the fans 71, and 72.

In the meantime, the heat exchanger 40 has the same configuration as the foregoing description, a detailed description will be omitted.

The heat exchanger 40 has a heat pipe 41 passing through the panel 50, for heat exchanging between the air passing through the inlet and the exhaust port 14, and the air passing through the outlet 12 and the supply port 13. In order to provide a large heat exchange area, the heat exchanger 40 is mounted between the inlet 11 and the fans 71, and 72, and the supply port 13 and the fans 71, and 72. In order to provide thus, the heat exchanger 40 is passed through, and secured to the panel 50, and bent at end portions of the fans 71, and 72, such that the heat exchanger 40 is symmetry with respect to the panel 50.

The heat exchanger 40 further includes a plurality of fins 42 in contact with an outside circumferential surface of the heat pipe 41, to enlarge a heat exchange area. Since the fin 42 is the same configuration with the foregoing one, detailed description of the fin 42 will be omitted.

Moreover, there is a filter 60 mounted on an inside or on an outside surface of the case 10. The filter filters air discharged into the room through the case 10. In more detail, the filter 60 is provided to the supply port 13. Of course, the filter 60 may be mounted on the outlet 12 or an inside of the case 10.

The operation of the ventilator 1 will be described.

Upon putting the fans 71, and 72 into operation, the room air is drawn into the case 10 through the inlet 11, and discharged to an outside of the room through the exhaust port 14. Outdoor air is drawn into the case 10 through the supply port 13, and discharged into the room through the outlet 12.

In this instance, if the room air temperature is higher than an outdoor air temperature, the air being discharged to an outside of the room is brought into contact with one side of the heat exchanger 40, to heat, and evaporate the working fluid in the heat exchanger 40.

The evaporated working fluid moves inside of the heat exchanger 40, to the other side of the heat exchanger 40. Then, the working fluid is condensed, and discharges heat at a portion where the other side of the heat exchanger 40 is in contact with the air discharged into the room, to transfer heat to the air discharged into the room. Then, the working fluid returns to the one side of the heat exchanger 40 again. In this instance, the working fluid returns to the one side of the heat exchanger 40 by the capillary tube phenomenon.

In the meantime, in an opposite case of above assumption, i.e., the room air temperature is lower than the outdoor air temperature, when an opposite phenomenon occurs, the outdoor air drops to a lower temperature, before the outdoor air is discharged into the room.

As has been described, by using a heat pipe as a heat exchanger, the ventilator of the present invention can reduce a height of the case substantially, permitting to reduce a height of each story of a building that uses such the ventilators.

Moreover, since the ventilator has a structure in which the room air and the outdoor air do not cross, air resistance, and noise can be reduced, significantly. Furthermore, the filter provided to a portion through which the outdoor air is drawn, a contact area of the filter is increased, to reduce damage of the filter by an air pressure, and enhance efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A ventilator comprising:
   a case having a first flow passage and a second flow passage therein;
   a first fan in the case for drawing room air in a room to outside of the room through the first flow passage;
   a second fan in the case for guiding outdoor air outside of the room to the room through the second flow passage;
   a heat exchanger in the case, the heat exchanger having a working fluid therein for repeating evaporation (heat absorption) and condensing (heat dissipation) by a temperature difference of the room air flowing through the first flow passage and the outdoor air flowing through the second flow passage to exchange heat between the room air flowing through the first flow passage and the outdoor air flowing through the second flow passage, the heat exchanger being located between an inlet of the first flow passage and the first fan and between an inlet of the second flow passage and the second fan, the inlet of the first flow passage being substantially perpendicular to an outlet of the second flow passage, the heat exchanger including at least one heat pipe; and
   a panel for isolating the first flow passage from the second flow passage, the at least one heat pipe passing through the panel,
   wherein the first and second fans draw air in an axial direction and discharge the air in a radial direction.

2. The ventilator as claimed in claim 1, wherein the heat exchanger includes a plurality of heat pipes.

3. The ventilator as claimed in claim 2, wherein the heat exchanger further includes a plurality of fins in contact with an outside circumferential surface of the heat pipe, for increasing a heat exchanger area.

4. The ventilator as claimed in claim 1, further comprising a panel for isolating the first flow passage from the second flow passage, the first fan being located in the first flow passage and the second fan being located in the second flow passage.

5. The ventilator as claimed in claim 4, wherein the heat exchanger includes heat pipes provided adjacent to each of the first and second fans.

6. The ventilator as claimed in claim 5, wherein the heat exchanger further includes a plurality of fins in contact with an outside circumferential surface of the heat pipe, for increasing a heat exchanger area.

7. The ventilator as claimed in claim 1, wherein the first flow passage is deflected at inside of the case such that a direction of an air flow introduced into the case from the room and a direction of the air flow discharged to outside of the room are different.

8. The ventilator as claimed in claim 1, wherein the second flow passage is deflected at inside of the case such that a direction of an air flow introduced into the case from outside of the room and a direction of the air flow discharged to the room are different.

9. The ventilator as claimed in claim 1, wherein the second flow passage further includes a filter provided between an inside of the case and outside of the room.

10. The ventilator as claimed in claim 1, wherein the first fan is located on a first side of the heat exchanger and the second fan is located on a second side of the heat-exchanger opposite to the first side, the first side facing a first direction and the second side facing a second direction opposite to the first direction.

11. The ventilator as claimed in claim 1, wherein the at least one heat pipe is bent with reference to the panel.

12. The ventilator as claimed in claim 11, wherein the at least one heat pipe has a shape generally symmetric with respect to the panel.

13. The ventilator as claimed in claim 1, wherein the case has a top sidewall, a bottom sidewall, a first lateral sidewall and a second lateral sidewall opposite to the first lateral sidewall, the inlet of the first flow passage being located at the bottom sidewall, the outlet of the first flow passage being located at the first lateral sidewall, the inlet of the second flow passage being located at the top sidewall, the outlet of the second flow passage being located at the second lateral sidewall.

14. The ventilator as claimed in claim 13, wherein each of the sidewalls is free of airflow openings except for the corresponding inlet or outlet.

15. The ventilator as claimed in claim 1, wherein the inlet of the second flow passage is substantially perpendicular to the outlet of the second flow passage.

16. A ventilator comprising:
a case having a first flow passage and a second flow passage therein;
a first fan in the case for drawing room air in a room to outside of the room through the first flow passage;
a second fan in the case for guiding outdoor air outside of the room to the room through the second flow passage;
a heat exchanger in the case, the heat exchanger having a working fluid therein for repeating evaporation (heat absorption) and condensing (heat dissipation) by a temperature difference of the room air flowing through the first flow passage and the outdoor air flowing through the second flow passage to exchange heat between the room air flowing through the first flow passage and the outdoor air flowing through the second flow passage, the heat exchanger being located between an inlet of the first flow passage and the first fan and between an inlet of the second flow passage and the second fan; and
a panel for isolating the first flow passage from the second flow passage, the first fan being located in the first flow passage and the second fan being located in the second flow passage;
wherein the heat exchanger includes a heat pipe provided adjacent to each of the first and second fans;
wherein the heat pipe passes through the panel and is bent so as to be mounted in front of each of the first and second fans.

17. The ventilator as claimed in claim 16, wherein the heat pipe has a shape generally symmetric with respect to the panel.

18. The ventilator as claimed in claim 16, wherein the inlet of the second flow passage is substantially perpendicular to an outlet of the second flow passage.

19. The ventilator as claimed in claim 16, wherein the case has a top sidewall, a bottom sidewall, a first lateral sidewall and a second lateral sidewall opposite to the first lateral sidewall, the inlet of the first flow passage being located at the bottom sidewall, an outlet of the first flow passage being located at the first lateral sidewall, the inlet of the second flow passage being located at the top sidewall, an outlet of the second flow passage being located at the second lateral sidewall.

20. The ventilator as claimed in claim 19, wherein each of the sidewalls is free of airflow openings except for the corresponding inlet or outlet.

21. A ventilator comprising:
a case having an inlet and an outlet in communication with a room and a supply port and an exhaust port in communication with an outside of the room;
a panel, the inlet and the exhaust port located on a first side of the panel, the supply port and the outlet located on a second, opposite side of the panel;
a first fan located on the first side of the panel for drawing room air to the outside of the room;
a second fan located on the second side of the panel for introducing outdoor air outside of the room into the room; and
a heat exchanger in the case, the heat exchanger having a working fluid therein for repeating evaporation (heat absorption) and condensing (heat discharge) by a temperature difference of the outdoor air to be introduced into the room and the room air to be discharged to outside of the room to exchange heat between the outdoor air to be introduced into the room and the room air to be discharged to outside of the room, the heat exchanger being located between the inlet and the first fan and between the supply port and the second fan, the inlet on a first side of the panel being substantially perpendicular to the outlet on the second side of the panel, the heat exchanger including a heat pipe passing through the panel,
wherein the panel isolates the first flow passage from the second flow passage, and the first and second fans draw air in an axial direction and discharge the air in a radial direction.

22. The ventilator as claimed in claim 21, wherein the heat exchanger further includes a plurality of fins in contact with an outside circumferential surface of the heat pipe, for increasing a heat exchanger area.

23. The ventilator as claimed in claim 21, wherein the heat pipe is bent with reference to the panel.

24. The ventilator as claimed in claim 23, wherein the heat exchanger further includes a plurality of fins in contact with an outside circumferential surface of the heat pipe, for increasing a heat exchanger area.

25. The ventilator as claimed in claim 21, wherein the exhaust port is perpendicular to the inlet such that a flow direction of air introduced into the case and a flow direction of air discharged to an outside of the room are different.

26. The ventilator as claimed in claim 21, wherein the outlet is perpendicular to the supply port such that a flow direction of air introduced into the case and a flow direction of air supplied to the room are different.

27. The ventilator as claimed in claim 21, further comprising a filter provided to the supply port.

28. The ventilator as claimed in claim 21, wherein the first fan is located on a first side of the heat exchanger and the second fan is located on a second side of the heat-exchanger opposite to the first side, the first side facing a first direction and the second side facing a second direction opposite to the first direction.

29. The ventilator as claimed in claim 21, wherein the case has a top sidewall, a bottom sidewall, a first lateral sidewall and a second lateral sidewall opposite to the first lateral sidewall, the inlet of the first flow passage being located at the bottom sidewall, the outlet of the first flow passage being located at the first lateral sidewall, the inlet of the second flow passage being located at the top sidewall, the outlet of the second flow passage being located at the second lateral sidewall.

30. The ventilator as claimed in claim 29, wherein each of the sidewalls is free of airflow openings except for the corresponding inlet or outlet.

* * * * *